United States Patent
Vondracek et al.

[11] Patent Number: 5,868,996
[45] Date of Patent: Feb. 9, 1999

[54] DEVICE FOR MANUFACTURING CURVED HELICAL SPRINGS

[75] Inventors: Hans Vondracek, Breckerfeld; Heinz Kröber, Hagen, both of Germany

[73] Assignee: Fried. Krupp AG Hoesch-Krupp, Dortmund, Germany

[21] Appl. No.: 98,594

[22] Filed: Jul. 28, 1993

[30] Foreign Application Priority Data

Jul. 29, 1992 [DE] Germany .......................... 42 24 951.1

[51] Int. Cl.⁶ .............................. C21D 1/62; B41F 35/00
[52] U.S. Cl. ............................ 266/116; 266/103; 72/135; 72/137; 72/138; 72/141; 72/145
[58] Field of Search .................................... 148/580, 103; 266/116; 72/135–145; 29/173, 126, 127; 104/89

[56] References Cited

U.S. PATENT DOCUMENTS 1,816,377  7/1931  Hobracht ................................ 266/116
2,218,864  10/1940  Widgren ................................ 266/116

FOREIGN PATENT DOCUMENTS 268045  10/1929  Italy ........................................ 266/116
1198713  7/1970  United Kingdom ................... 266/116

*Primary Examiner*—Sikyin Ip
*Attorney, Agent, or Firm*—Max Fogiel

[57] ABSTRACT

The objects are a reliable and economical method of and device for manufacturing helical springs that are curved when unstressed from sections of wire or rod heated to coiling temperature. The spring is coiled straight and then curved it to its final shape. The device consists of a hot-coiling production line comprising a kiln (1), a series of rollers (2), a coiling bench (4), and a quenching tub (6). A tool (5) for curving helical springs (10 or 14) is integrated into the production line between the coiling bench and the quenching tub.

9 Claims, 8 Drawing Sheets

DEVICE FOR MANUFACTURING CURVED HELICAL SPRINGS

BACKGROUND OF THE INVENTION

Helical springs that are curved when unstressed are known from German Patents 1 505 616 and 3 743 450 for example. Springs of this type are employed to advantage in automotive-axle dashpots because they can be positioned with their curvature extensively compensating for undesirable friction and bending moments against the shock-absorber piston rod.

Curved helical springs have until now been manufactured only on cold-winding mechanism without mandrels as described for instance on pages 60 to 62 of Meissner and Wanke's Handbuch Federn, Berlin, VEB Verlag Technik, 1988. This procedure achieves the desired curvature without the expense of varying every other winding flight.

Helical springs can in one particular alternative to winding without using mandrels be manufactured hot on what are called coiling benches. They can be shaped by two parallel cylindrical rollers, one called the mandrel and the other the trainer. The training function can on the other hand be assumed by a computerized numerically controlled wire and rod feed as described on pages 185 and 186 of the Hoesch Hohenlimburg AG literature Warmgeformte Federn issued on the occasion of the 52nd IAA in Frankfurt-am-Main in 1987 and on pages 106 and 107 of the Stahlwerke Brüninghaus GmbH literature Technische Data Fahrzeugfedern issued on the occasion of the 45th IAA in Frankfurt-am-Main in 1973.

German 4 124 326 discloses a method of manufacturing curved helical springs on existing hot-coiling production lines by cooling or heating sections of the coil before or while it sets.

Reproducible industrial-scale manufacture of curved helical springs by this known method extensively depends on local flow boundaries, which are directly determined by the spring's temper strength and local temperatures.

In addition to the locally affected flow boundaries, stress that is precisely selected in accordance with the particular cross-section or coil section must be applied during the setting phase to achieve the desired curve. This is much too expensive, given contemporary tolerance demands.

SUMMARY OF THE INVENTION

The objects of the present invention are accordingly a method of the aforesaid genus and a device for carrying out that method that can be employed with existing production lines to economically and reliably produce the desired curve or bend.

The objects of the present invention are attained by providing a manufacturing method in which the helical springs are curved when un-stressed from sections of wire or rod heated to coiling temperature, in which a spring is first coiled straight and then curved to a final shape.

The raw ends of the wire or rod at each end of the spring are bent in before the spring is curved into the final shape.

One shaping phase follows the other so directly that the heat conventionally used to shape the spring is subsequently exploited to harden it in quenching.

To carry out the method of the present invention, there is provided a hot-coiling production line having a kiln 1, series of rollers 2, a coiling bench 4, and a quenching tub 6. A tool 5 is provided for curving helical springs 10 or 14 that are integrated into the production line between the coiling bench and the quenching tub.

The spring-curving tool 5 is similar to a press with a top 8 and a bottom 9. A freshly-coiled straight spring 10 can be inserted into the open tool between the top and the bottom. At least one die 13 is accommodated in the top and/or bottom, and the die is shaped to produce the desired curve. The spring-curving tool 5, furthermore, is accommodated in a frame 11 that straddles the tub 6 and immerses it in the tub.

Several spring-curving tools 5 may be distributed around a drum 12 that rotates over the tub 6 and immerses them in the tub.

The die 13 may be separate and separately adjusted for each and every point of contact with the windings of the spring in the curving tool 5. The dies 13, moreover, may be spring-mounted.

The dies 13 can be displaced horizontally while or after the spring-curving tool 5 closes. The bottom 9 of the spring-curving tool 5 may be rotatable or pivotable.

The particular advantages of the method and device in accordance with the invention are that curved helical springs can be manufactured essentially with existing production facilities and satisfactory reproducibility, subject to contemporary tolerances, and without great additional expense.

BRIEF DESCRIPTION OF THE DRAWINGS

The invention will now be specified with reference to the embodiments illustrated by way of example in the accompanying drawing, wherein.

DESCRIPTION OF THE PREFERRED EMBODIMENTS

Figure 1:
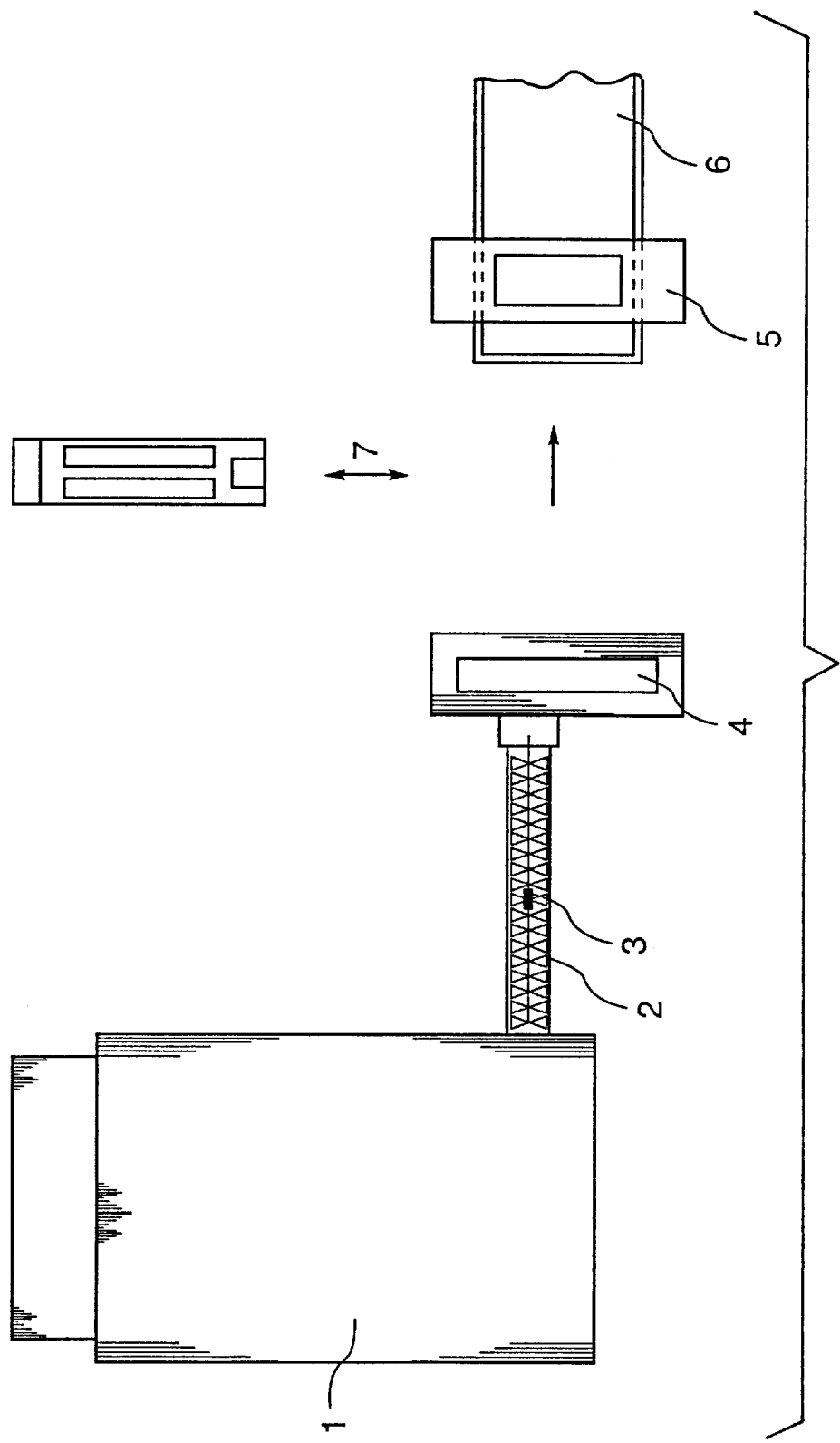
FIG. 1 is a plan of a hot-winding production line.

Rod 3 is heated in the kiln 1 illustrated in FIG. 1 and supplied to a coiling bench 4 over rollers 2.

A straight helical spring 10 is produced (FIGS. 2 & 4) on bench 4 and optionally supplied to a blunter 7 that bends in the raw ends of the rod at each end of the spring.

Figure 2:
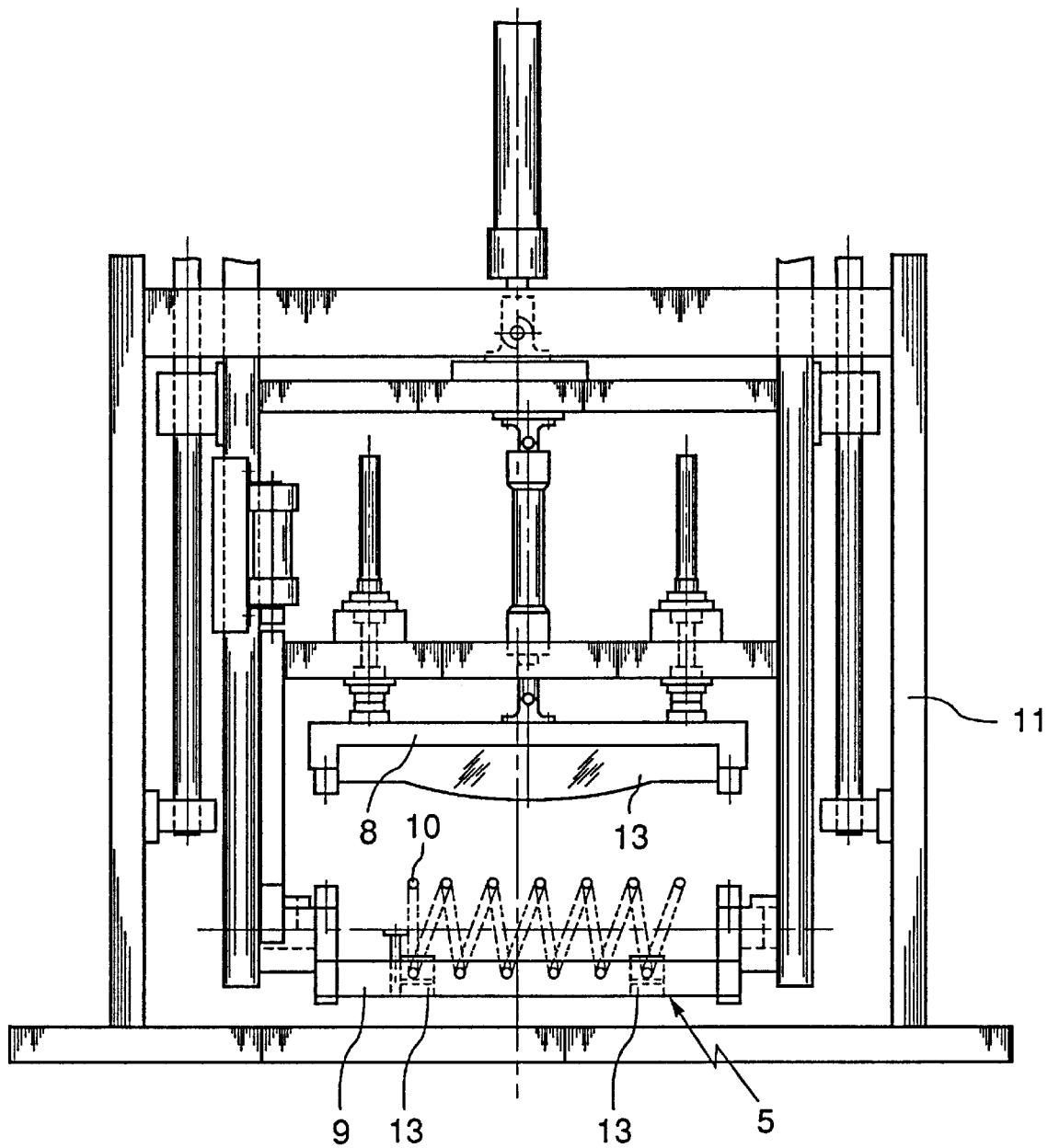
FIG. 2 is a front view of a spring-curving tool open.
Figure 3:
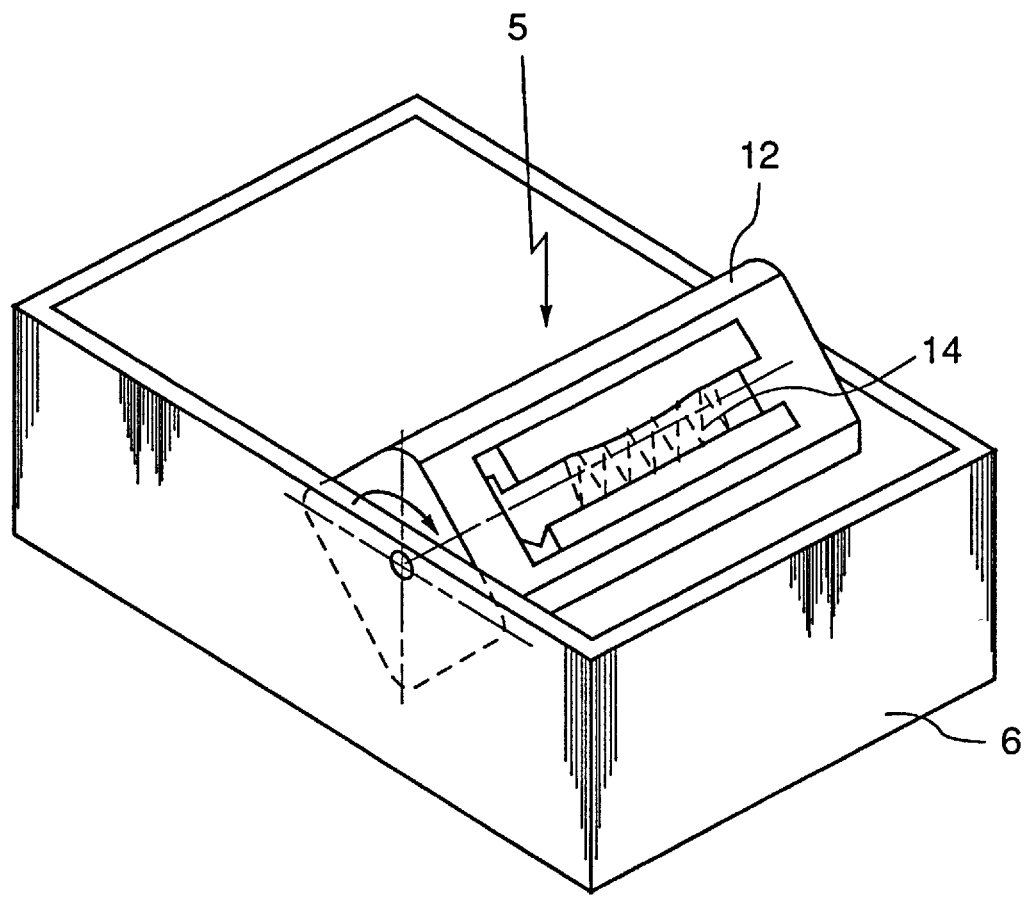
FIG. 3 is a perspective view of another spring-curving tool.
Figure 4:
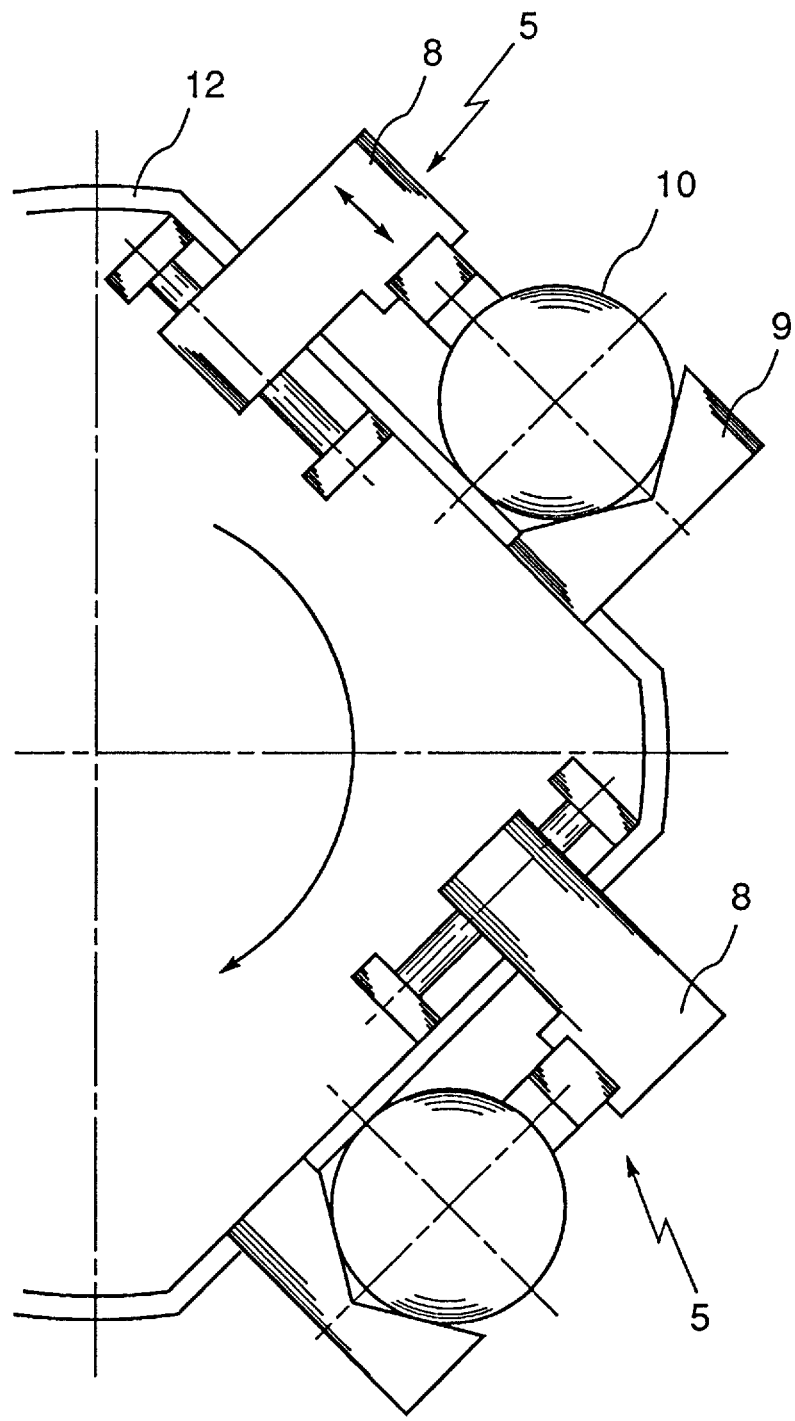
FIG. 4 is a larger-scale side view of the tool illustrated in FIG. 3.
Figure 5:
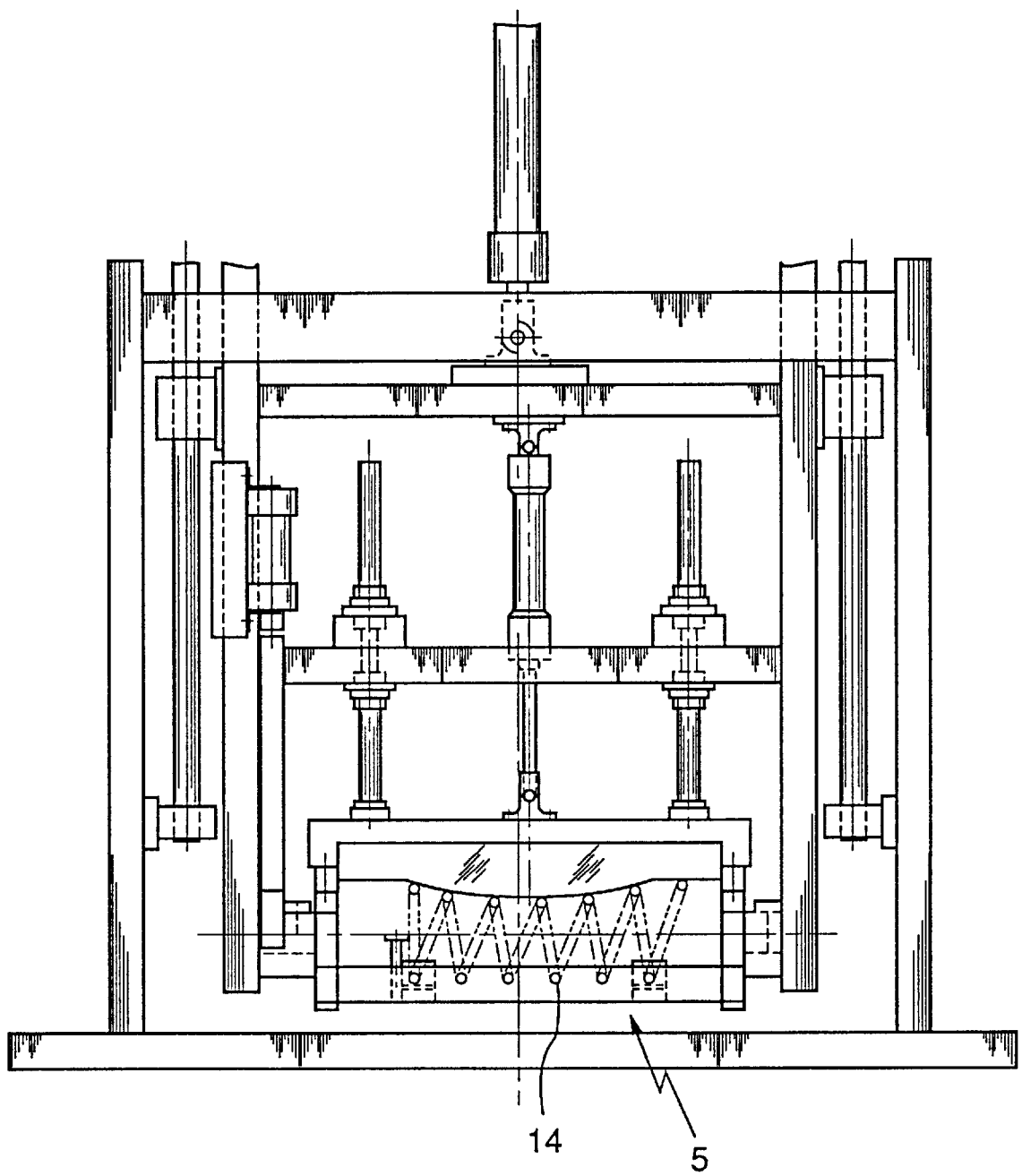
FIG. 5 illustrates the tool illustrated in FIG. 2 closed.
Figure 6:
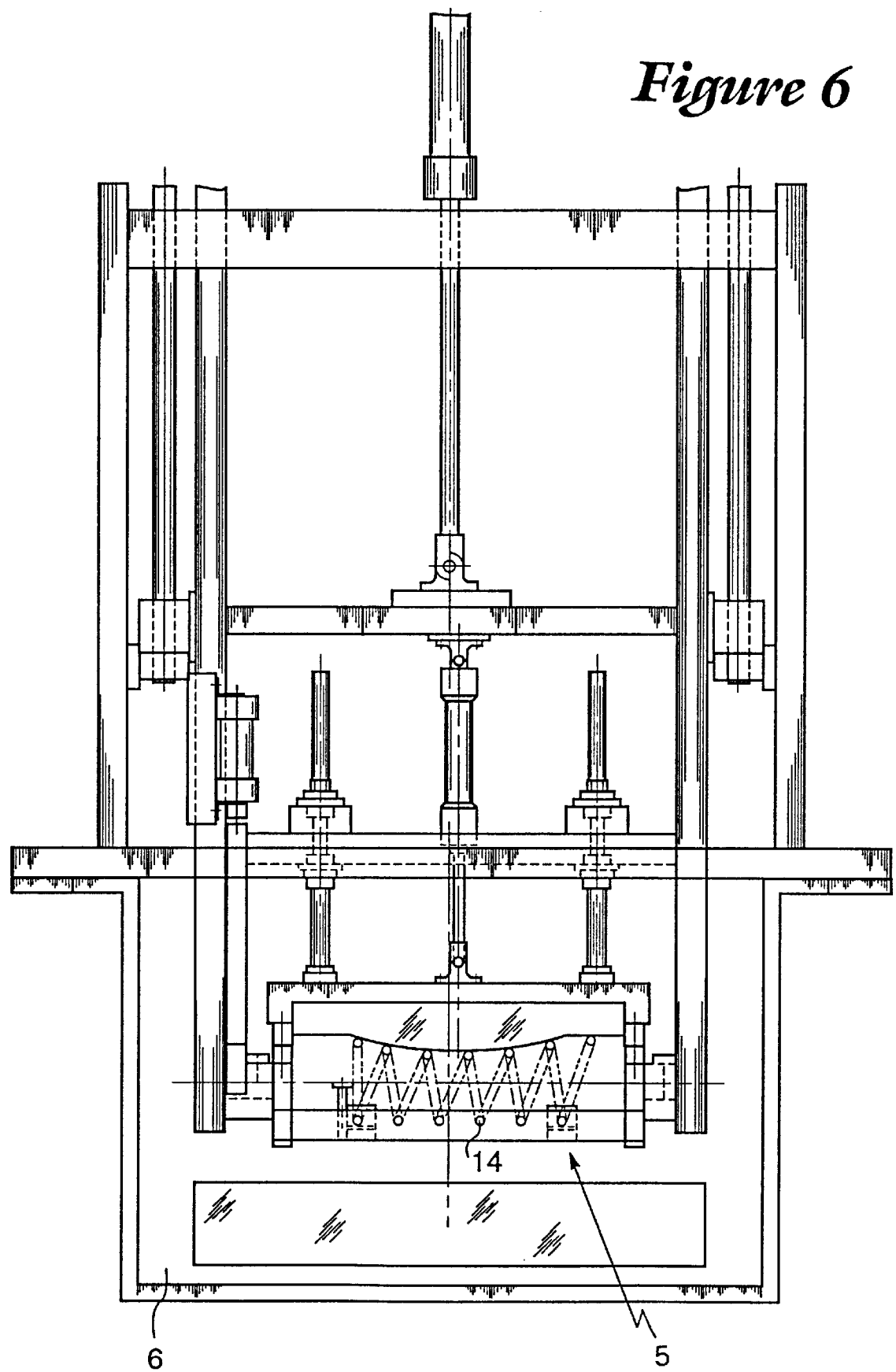
FIG. 6 illustrates the tool illustrated in FIG. 5 lowered.

Semifinished spring 10 is positioned in a spring-curving tool 5 (FIGS. 2 & 4). Tool 5 is a press with a top 8 and a bottom 9. Several such tools are positioned as illustrated in FIGS. 3 and 4 around a drum 12. Drum 12 extends horizontal from wall to wall of a hardening tub 6. Each tool 5 closes over and curves a helical spring 14 (FIG. 3). The drum rotates and immerses each curving tool 5 and the spring 14 inside it in tub 6 in succession.

The desired curve is produced in springs 10 and 14 inside the closed spring-curving tool 5 by a complete (FIGS. 2 through 7) or incomplete (FIG. 8) fit between dies 13 mounted in the top 8 and bottom 9 of spring-curving tool 5.

Figure 8:
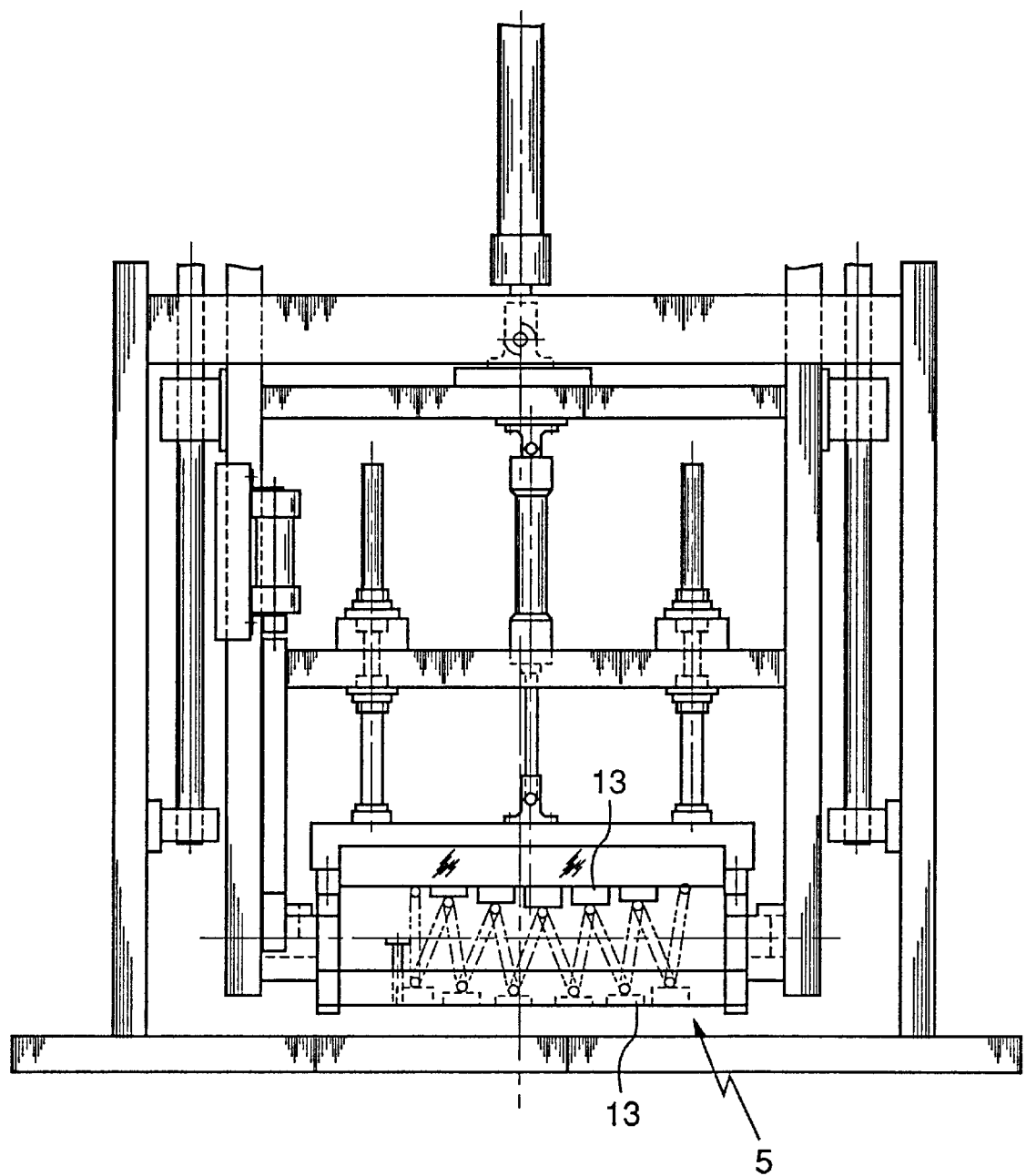
FIG. 8 is a front view of another spring-curving tool.

As will be evident from FIG. 8, an incomplete fit is attained by using a separate and separately adjusted die 13 for each and every point of contact with the windings of the spring.

Figure 7:
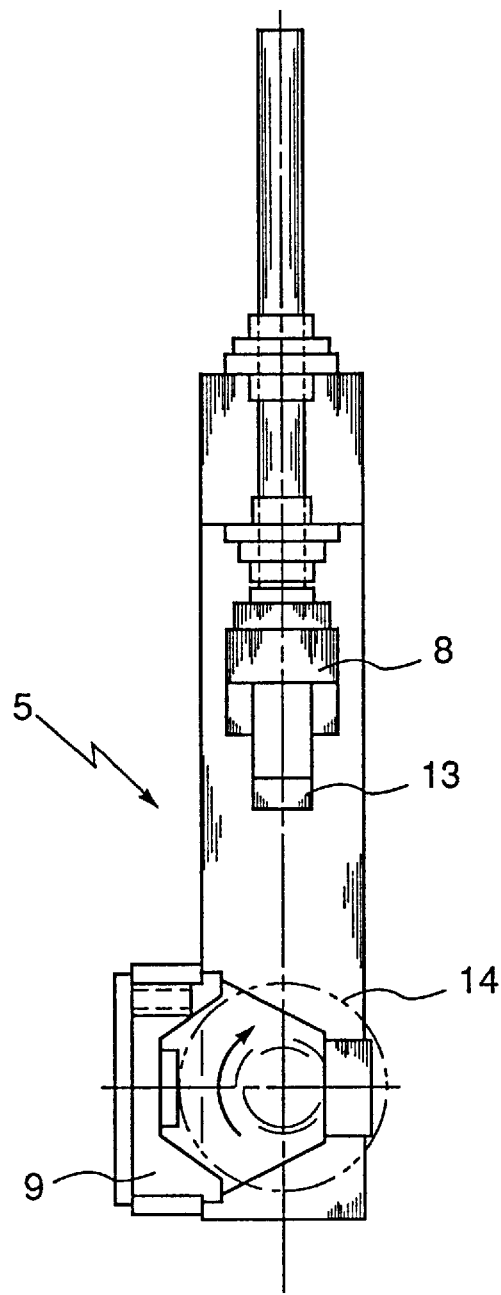
FIG. 7 is a side view of part of the tool illustrated in FIGS. 2, 5, and 6.

Once spring-curving tool 5 has been immersed closed over a curved spring 14 in tub 6, the tool is opened and the spring removed from bottom 9, which can be done as illustrated in FIG. 7 by pivoting the bottom 90°.

Spring-curving tool 5 is then returned from tub 6 to its original loading position.

We claim:

1. Apparatus for manufacturing continuously hot-worked, hot-coiled helical springs with a bent major central axis that are curved when unstressed from sections of wire or rod, comprising: heating means for heating sections of straight wire or rod to coiling temperature; coiling means communicating with said heating means for coiling the heated sections and forming a straight spring; curving means downstream of said coiling means for receiving said straight spring from said coiling means for curving said spring to a specific shape taken by said spring when in the unstressed state; said coiling means having rollers, and a coiling bench, said rollers conveying the heated sections from said heating means to said coiling bench; a quenching tub communicating with said curving means for quenching said spring after leaving said curving means; said curving means curving helical springs between said coiling bench and said quenching tub, said helical springs being manufactured continuously without interruptions and without intermediate heating of the coiled spring before hardening, said curving means forcing said helical springs to assume a curvature before hardening, said curvature being irreversibly held through a temperature controlled variation of flow conditions in locally limited coil sections, individual turns of the coiled helical springs having a radial displacement from turn to turn independent from adjustable contact points for optimizing a curvature of the helical springs; a drum rotating over said tub and partially immersed in said tub, said curving means comprising a plurality of spring-curving tools distributed around said drum and immersed into said tub by said drum, rollers, and coiling bench forming a hot-coiling production line, said central axis being bent as a whole even when free of load.

2. Apparatus as defined in claim 1, including a frame for holding said curving means, said frame straddling said quenching tub and immersing said curving means into said tub.

3. Apparatus as defined in claim 1, wherein said curving means comprises a press with a top and a bottom, said curving means having an open position for receiving a freshly coiled straight spring between said top and said bottom; at least one die shaped for producing curving of said spring being received in at least one of said top and said bottom.

4. Apparatus as defined in claim 3, wherein said bottom of said tool means is pivotable.

5. Apparatus as defined in claim 3, wherein said spring has windings; a separate and separately adjusted die for each and every point of contact with said windings in said tool means.

6. Apparatus as defined in claim 5, wherein said die is spring-mounted.

7. Apparatus as defined in claims 5, wherein said die is displaceable horizontally while or after said tool means is in a closed position.

8. Apparatus for manufacturing hot-coiled helical springs with a bent major central axis that are curved when unstressed from sections of wire or rod, comprising: heating means for heating sections of wire or rod to coiling temperature; coiling means communicating with said heating means for coiling the heated sections and forming a straight spring; curving mean downstream of said coiling means for receiving said straight spring from said coiling means for curving said spring to a specific shape taken by said spring when in the unstressed state; said coiling means having rollers, and a coiling bench, said rollers conveying the heated sections from said heating means to said coiling bench; a quenching tub communicating with said curving means for quenching said spring after leaving said curving means; said curving means curving helical springs between said coiling bench and said quenching tub; a drum rotating over said tub and partially immersed in said tub, said curving means comprising a plurality of spring-curving tools distributed around said drum and immersed into said tub by said drum, rollers, and coiling bench forming a hot-coiling production line, said central axis being bent as a whole even when free of load.

9. Apparatus for manufacturing continuously hot-worked, hot-coiled helical springs with a bent major central axis that are curved when unstressed from sections of wire or rod, comprising: heating means for heating sections of straight wire or rod to coiling temperature; coiling means communicating with said heating means for coiling the heated sections and forming a straight spring; curving means downstream of said coiling means for receiving said straight spring from said coiling means for curving said spring to a specific shape taken by said spring when in the unstressed state; said coiling means having rollers, and a coiling bench, said rollers conveying the heated sections from said heating means to said coiling bench; a quenching tub communicating with said curving means for quenching said spring after leaving said curving means; said curving means curving helical springs between said coiling bench and said quenching tub, said helical springs being manufactured continuously without interruptions and without intermediate heating of the coiled spring before hardening, said curving means forcing said helical springs to assume a curvature before hardening, said curvature being irreversibly held through a temperature controlled variation of flow conditions in locally limited coil sections, individual turns of the coiled helical springs having a radial displacement from turn to turn independent from adjustable contact points for optimizing a curvature of the helical springs, said central axis being bent as a whole even when free of load.

\* \* \* \* \*